(12) United States Patent
Kumar

(10) Patent No.: US 10,372,694 B2
(45) Date of Patent: Aug. 6, 2019

(54) STRUCTURED INFORMATION DIFFERENTIATION IN NAMING

(71) Applicant: Adobe Inc., San Jose, CA (US)

(72) Inventor: Amit Kumar, Kurukshetra (IN)

(73) Assignee: Adobe Inc., San Jose, CA (US)

( * ) Notice: Subject to any disclaimer, the term of this patent is extended or adjusted under 35 U.S.C. 154(b) by 182 days.

(21) Appl. No.: 14/510,004

(22) Filed: Oct. 8, 2014

(65) Prior Publication Data

US 2016/0103864 A1    Apr. 14, 2016

(51) Int. Cl.
*G06F 16/16*    (2019.01)
*G06F 16/22*    (2019.01)
*G06F 16/14*    (2019.01)
*G06F 16/185*    (2019.01)
*G06F 17/22*    (2006.01)

(52) U.S. Cl.
CPC ........ *G06F 16/2246* (2019.01); *G06F 16/148* (2019.01); *G06F 16/166* (2019.01); *G06F 16/168* (2019.01); *G06F 16/185* (2019.01); *G06F 17/2247* (2013.01); *G06F 17/2288* (2013.01)

(58) Field of Classification Search
CPC .......... G06F 17/3089; G06F 17/30106; G06F 17/30126; G06F 17/30221; G06F 17/30327; G06F 17/2288; G06F 17/30896; G06F 17/2247; G06F 17/211; G06F 17/24; G06F 16/2246; G06F 16/148; G06F 16/166; G06F 16/168; G06F 16/185
See application file for complete search history.

(56) References Cited

U.S. PATENT DOCUMENTS

| | | | | |
|---|---|---|---|---|
| 5,388,257 | A * | 2/1995 | Bauer | G06F 17/30106 707/741 |
| 5,664,206 | A * | 9/1997 | Murow | G06F 9/4448 704/5 |
| 6,055,540 | A * | 4/2000 | Snow | G06F 17/3061 |
| 7,324,514 | B1 * | 1/2008 | Haq | H04L 12/66 370/392 |
| 7,640,228 | B2 * | 12/2009 | Horentrup | G06F 17/30067 |
| 8,285,760 | B1 * | 10/2012 | Sina | G06F 17/30268 707/803 |

(Continued)

*Primary Examiner* — Thu V Huynh
(74) *Attorney, Agent, or Firm* — SBMC

(57) ABSTRACT

Structured information differentiation in naming techniques are described. In one or more embodiments, first and second collections of structured information are tokenized to generate a first ordered list of tokens that correspond to the first collection of structured information and a second ordered list of tokens that correspond to the second collection of structured information. The first and second ordered list of tokens are inserted into a tree structure in order by assigning tokens from the first and second ordered lists that match in the order to a same node and assigning non-matching tokens to different nodes. The first and second collections of the structured information are tagged by traversing the tree structure such that both the first and second collections of the structured information are tagged using at least one said token that matches and the first collection of structured information is tagged using one or more other said tokens that are different than one or more other said tokens that are used to tag the second collection of structured information.

13 Claims, 6 Drawing Sheets

(56) References Cited

U.S. PATENT DOCUMENTS

| | | | | |
|---|---|---|---|---|
| 8,515,911 | B1* | 8/2013 | Zhou | G06F 17/3023 707/638 |
| 9,087,139 | B2* | 7/2015 | Josifovski | G06F 17/30938 |
| 9,135,367 | B2* | 9/2015 | Li | G06F 17/30932 |
| 2005/0102528 | A1* | 5/2005 | Tan | G06F 21/10 713/193 |
| 2006/0242122 | A1* | 10/2006 | DeVorchik | G06F 17/30106 |
| 2007/0083485 | A1* | 4/2007 | Hashimoto | G06F 17/30887 |
| 2007/0179961 | A1* | 8/2007 | Gava | G06F 17/2247 |
| 2009/0030921 | A1* | 1/2009 | Kadiyska | G06F 17/272 |
| 2009/0063500 | A1* | 3/2009 | Zhai | G06F 17/30911 |
| 2010/0070515 | A1* | 3/2010 | Dutton | G06F 17/30091 707/755 |
| 2011/0078158 | A1* | 3/2011 | Mukherjea | G06F 17/30734 707/749 |
| 2011/0208703 | A1* | 8/2011 | Fisher | G06F 17/3092 707/692 |
| 2014/0122428 | A1* | 5/2014 | Zhou | G06F 17/30179 707/623 |
| 2014/0122542 | A1* | 5/2014 | Barnes | G06F 17/30126 707/822 |
| 2016/0035114 | A1* | 2/2016 | Hesse | G06T 11/206 345/440 |

\* cited by examiner

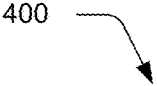

400

402
Tokenize first and second collections of structured information by a computing device to generate a first ordered list of tokens that correspond to the first collection of structured information and a second ordered list of tokens that correspond to the second collection of structured information

404
Inserting the first and second ordered list of tokens into a tree structure by the computing device in order by:

406
Assign tokens from the first and second ordered lists that match in the order to a same node

408
Assign non-matching tokens to different nodes

410
Tag the first and second collections of the structured information by traversing the tree structure such that both the first and second collections of the structured information are tagged using at least one said token that matches and the first collection of structured information is tagged using one or more other said tokens that are different than one or more other said tokens that are used to tag the second collection of structured information

412
Output the tags of the first and second collections of structured information

Fig. 4

STRUCTURED INFORMATION DIFFERENTIATION IN NAMING

BACKGROUND

Users continue to interact with an ever increasing amount of files in a given day in every aspect of their life. In some instances, this interaction may involve a related group of files, which consequently may have similar names. In a work scenario, for instance, users may interact with files related to a special project and consequently files involved with that project may have names that match.

Conventional techniques that are utilized to represent these files having the similar names in a user interface, however, may not enable a user to readily identify differences in the files, such as who created them, different types, versions, and so forth. Consequently, in conventional techniques a user may be forced to manually open and view these different files to locate a particular file of interest, which may be time consuming and frustrating to a user and thus hinder a user's interaction with these files.

SUMMARY

Structured information differentiation in naming techniques is described. In one or more embodiments, first and second collections of structured information are tokenized to generate a first ordered list of tokens that corresponds to the first collection of structured information and a second ordered list of tokens that corresponds to the second collection of structured information. The first and second ordered list of tokens are inserted into a tree structure in order by assigning tokens from the first and second ordered lists that match in the order to a same node and assigning non-matching tokens to different nodes. The first and second collections of the structured information are tagged by traversing the tree structure such that both the first and second collections of the structured information are tagged using at least one said token that matches. Additionally, the first collection of structured information is tagged using one or more other said tokens that are different than one or more other said tokens that are used to tag the second collection of structured information. The tags of the first and second collections of structured information are then output.

In one or more embodiments, a system includes one or modules implemented at least partially in hardware. The one or more modules are configured to perform operations including obtaining first and second file paths corresponding to first and second files stored in a file system and tokenizing the first and second file paths to generate respective first and second ordered lists of tokens. The operations also include inserting the first and second ordered lists of tokens into a tree structure in order including assigning tokens from the first and second ordered lists that match in the order to a same node and assigning non-matching tokens to different nodes. The operations further include assigning first and second names to the first and second files for output in a user interface by traversing the tree structure such that both the first and second names include at least one token that matches, one to another, and the first name includes one or more other tokens that are different than one or more other tokens that are used in the second name.

In one or more embodiments, a system includes one or modules implemented at least partially in hardware. The one or more modules are configured to perform operations including tokenizing first and second collections of structured information by a computing device to generate a first ordered list of tokens that correspond to the first collection of structured information and a second ordered list of tokens that correspond to the second collection of structured information. The first and second ordered list of tokens are inserted into a tree structure by the computing device in order by assigning tokens from the first and second ordered lists that match in the order to a same node and creating branches in the tree structure when respective tokens from the first and second ordered lists in the order do not match. The first and second collections of the structured information are then tagged by traversing the tree structure such that both the first and second collections of the structured information are tagged using at least one token that matches and the first and second collections are differentiated using tokens from the created branches and the tags of the first and second collections of structured information are output.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 4 is a flow diagram depicting a procedure in accordance with one embodiment in which tokenizing and tagging are utilized to differentiate structured information.

DETAILED DESCRIPTION

Overview

During interaction with a computing device, users may encounter files that have similar representations (e.g., names) that are used to identify the files. Because of this similarity, however, it may be difficult for a user to differentiate between the files.

Structured information differentiation in naming techniques are described. In one or more implementations, structured information is processed in a manner that may indicate both a relationship and to also differentiate files having similar names. A computing device, for instance, may obtain a file path for two or more files and tokenize the file path to form tokens based on file path separators, e.g., "/." The tokens are arranged into ordered lists that follow an order of a structure of the information (e.g., the file path) used to form the tokens.

The ordered lists are then inserted into a tree structure in a manner that follows the order. For example, the computing device may walk the ordered lists in an order of a file path and insert matching tokens, in the order, to share nodes in the tree structure. Non-matching tokens, on the other hand, are assigned to different nodes thereby forming branches in the tree structure. This tree structure may then be used to tag the files based on the structure. For instance, each of the files may be assigned a token that matches based on the structure, and thus indicate a relationship between the files. The files may also be assigned a non-matching token from the branches to differentiate the files from each other. These tags may then be used for a variety of purposes, such as names for the files in a user interface such that a user may readily differentiate the files yet still view a correspondence of the files to each other. Further discussion of these and other examples may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
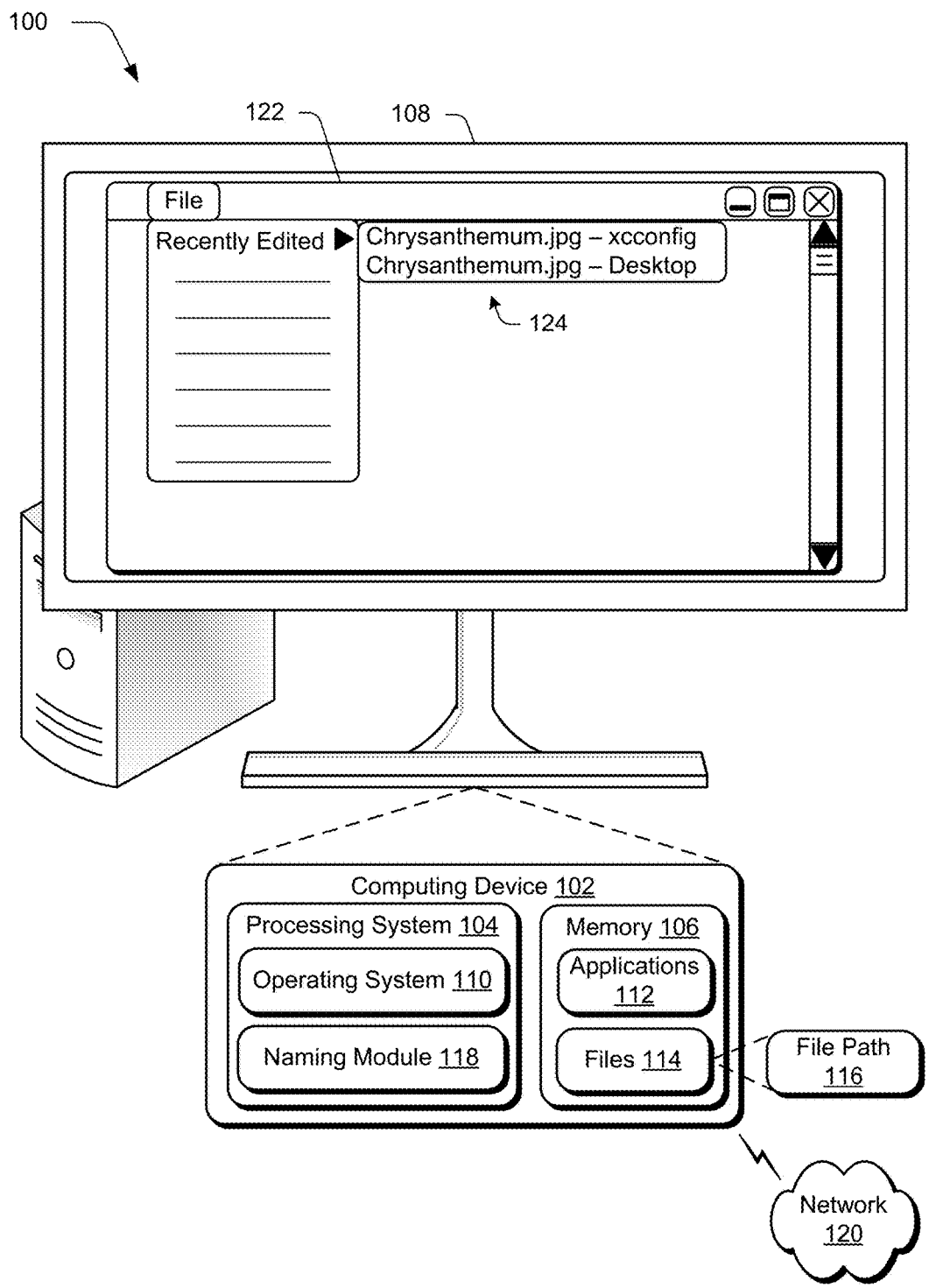
FIG. 1 is an illustration of an environment in accordance with one embodiment that is operable to employ structured information differentiation in naming techniques described herein.

FIG. 1 is an illustration of an environment 100 according to one or more embodiments that is operable to employ structured information differentiation in naming techniques described herein. The illustrated environment 100 includes a computing device 102, which may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, and so forth.

Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on.

The computing device 102 is illustrated as including a variety of hardware components, examples of which include a processing system 104, an example of a computer-readable storage medium illustrated as memory 106, a display device 108, and so on. The processing system 104 is representative of functionality to perform operations through execution of instructions stored in the memory 106. Although illustrated separately, functionality of these components may be further divided, combined (e.g., on an application specific integrated circuit), and so forth without departing from the spirit and scope thereof.

The computing device 102 is further illustrated as including an operating system 110. The operating system 110 is configured to abstract underlying functionality of the computing device 102 to applications 112 that are executable on the processing system 104 of the computing device 102. For example, the operating system 110 may abstract functionality of hardware components such as the processing system 104, memory 106, network, and/or display device 108 as well as software functionality of the computing device 102 such that the applications 112 may be written without knowing "how" this underlying functionality is implemented. The application 112, for instance, may provide data to the operating system 110 to be rendered and displayed by the display device 108 without understanding how this rendering will be performed.

The operating system 110 may also represent a variety of other functionality, such as to manage a file system and user interface that is navigable by a user of the computing device 102. For example, the computing device 102 may include a plurality of files 114 stored in memory 106. Each of the files 114 may have an associated file path 116 maintained by the operating system 110 that is usable to access the files 114. The file paths 116, for instance, may be thought of as a hierarchical series of folders and thus have a structured format that is usable to locate a particular file 114 of interest.

The computing device 102 is also illustrated as including a naming module 118. The naming module 118 is representation of functionality usable to perform structured information differentiation in naming. Although illustrated as a standalone module, the naming module 118 may be configured in a variety of other ways, such as part of the operating system 110, applications 112, remotely via a network 120, and so forth.

The naming module 118 may be utilized by the computing device 102 to differentiate similar and duplicate elements of structured information by meaningful keyword extraction and tagging. For example, consider a scenario in which applications 112 encounters collections of elements of information in a form that may appear as a duplicate with other elements. As illustrated, a user interface 122 may be generated by an application 112 for output on the display device 108 that includes a list of recently edited or opened files to aid a user in locating a recent file 114 of interest.

A situation may be encountered, however, in which there are two or more files 114 that may appear as duplicates using conventional naming techniques, e.g., may be different versions of the same file, located at different sources (e.g., memory 106 versus the network 120), and so forth. The naming module 118, however, may be utilized to support differentiation in naming 124 of these files 114 such that a user may readily identify meaningful differences in the files 114 to locate a file of interest, e.g., to differentiate "Chrysanthemum.jpg-xcconfig" from "Chrysanthemum.jpg-Desktop" as further described below. Other examples are also contemplated.

In another example, applications 112 may be configured to support simultaneous viewing of multiple files 114 in a user interface displayed by the display device 108. Here to, the naming module 118 may be employed to provide names in the user interface to identify similarity of these different files along with notable differences in the files 114 for differentiation. In this way, a user may readily determine relationships of the files including commonalities and differences.

Files 114 may take a variety of different forms, including documents as described above, images, sound files, media content, or other data. In a scenario that involves contacts, for instance, two or more contacts may have a same name (e.g., from different sources) or similar names (e.g., father and son) in a user's list of contacts. Accordingly, the naming module 118 may be employed to avoid confusion for the user by presenting the names of the contacts in a form that is differentiated from each other. Further discussion of these and other examples may be found in the following description and is shown in corresponding figures.

Figure 2:
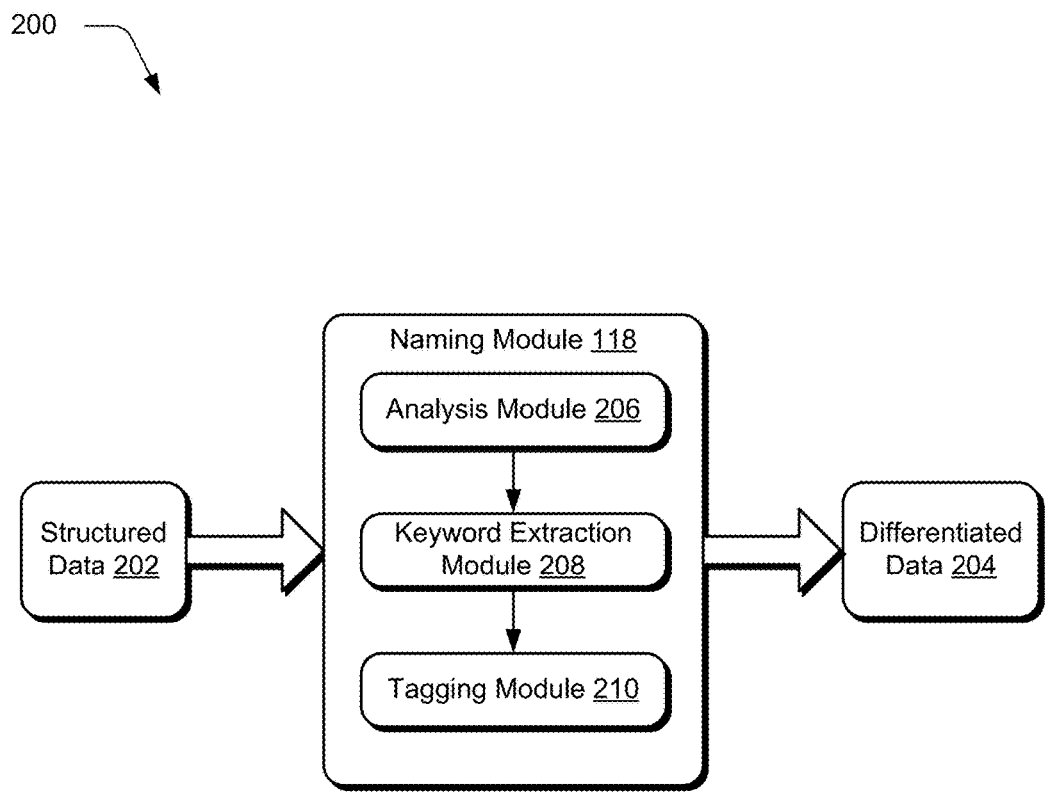
FIG. 2 depicts a system in accordance with one embodiment in which function of a naming module of FIG. 1 is shown in greater detail.

FIG. 2 depicts a system 200 in an example implementation in which function of the naming module 118 is shown in greater detail. As illustrated, the naming module 118 accepts structured data 202 as an input and outputs differentiated data 204. To do this, the naming module 118 employs functionality represented by an analysis module 206, keyword extraction module 208, and a tagging module 210.

The naming module 118, for instance, may utilize the analysis module 206 to form tokens from structured data 202. The keyword extraction module 208 may then be utilized to extract keywords usable for tagging by the tagging module 210 to form the differentiated data 204. In the following example, a scenario is discussed in which the structured data 202 are file paths 116 of corresponding files 114 that are to be represented using names in a user interface. However, it should be readily apparent that these techniques are equally applicable to any arbitrary structured information.

The naming module 118, for instance, may accept as an input structured information, which in this instance is a list of file paths as follows:
"/Users/labuser/Desktop/SamplePictures/Chrysanthemum.jpg"; and
"/Users/labuser/Desktop/Source/xxconfig/SamplePictures/Chrysanthemum.jpg."

Each file path 116 is tokenized in which a file path separator (e.g., "/") is used as a token separator. Special tokens representing a beginning (e.g., "^") and end (e.g., "$") of the tokens are also inserted into the list. Continuing with the previous example, the tokens that are tokenized from the file path are as follows:
^, Users, labuser, Desktop, SamplePictures, Chrysanthemum.jpg, $; and
^, Users, labuser, Desktop, Source, Xcconfig, SamplePictures, Chrysanthemum.jpg, $.

The tokens from each list are then inserted into a tree data structure having nodes that are represented as following:

```
Struct token_tree_node_t
{
    token_t m_token; // token at the node
    std::size_t m_expr_id; // valid at the terminal node, solely
    std::size_t m_multiplicity; // number of terminal nodes that have this
    node as their ancestor
    std::vector<token_tree_node_t > m_children; // references to the child
    nodes
};
```

Insertion also returns a unique number for each list. When differentiation is performed, this number may be used to map results to lists. An example of an insertion technique is as follows:

```
id insert (tokens, tokens_size)
{
    if (tokens_size == 0) return m_expr_id; // no more tokens
    child_idx = find a child whose m_token matches toeksn [tokens_size];
```

-continued

```
    if (child idx == not_found)
    {
        child_idx = create a new child node for tokens [token_size];
    }
    Return insert (tokens, token_size − 1);
}
```

Figure 3:
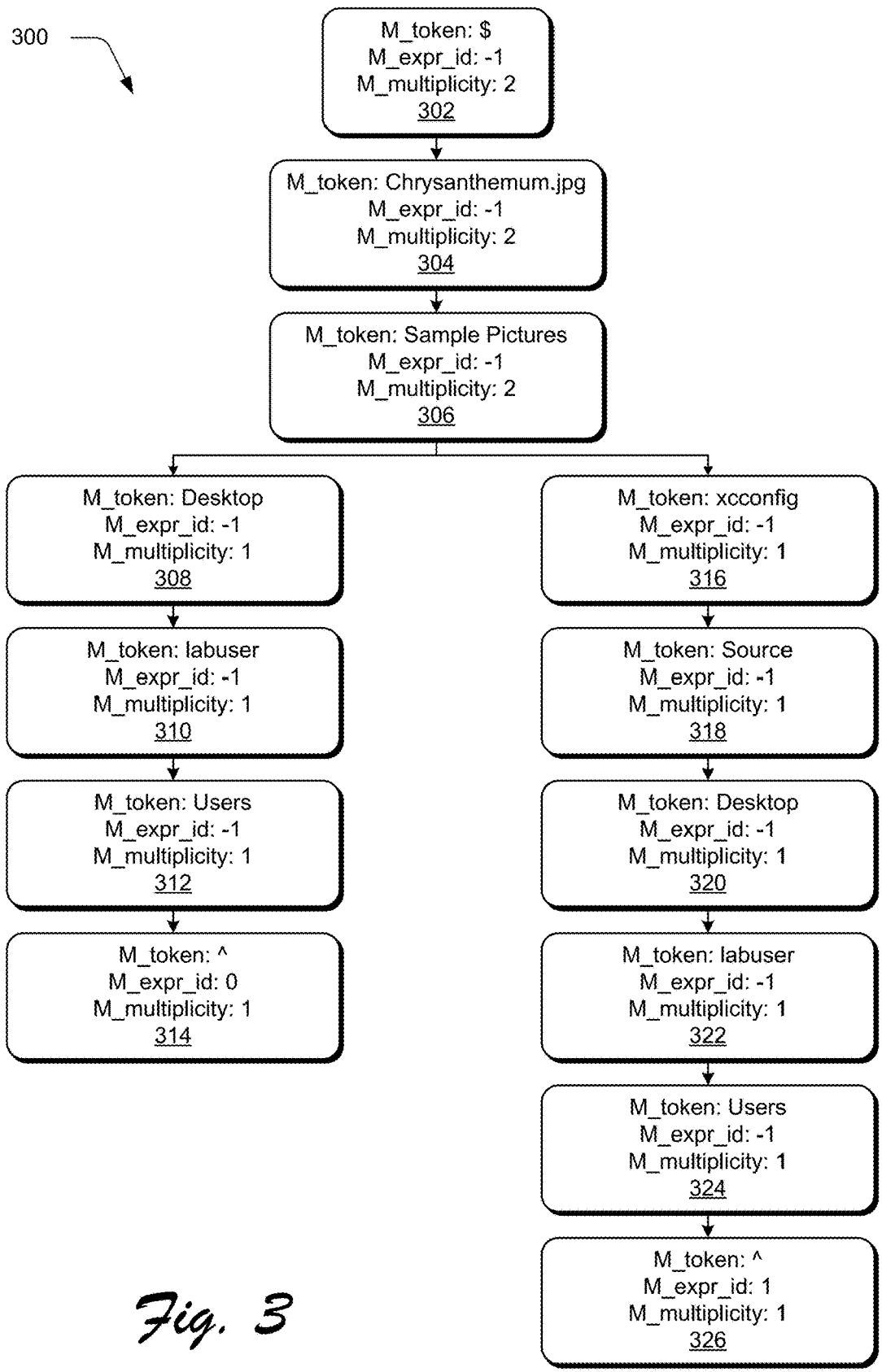
FIG. 3 depicts an example embodiment of a tree structure after both ordered lists are inserted into nodes of a tree.

FIG. 3 depicts an example implementation of a tree structure 300 after both ordered lists are inserted into nodes of a tree. As illustrated the tree structure 300 includes nodes 302-326 formed by walking the ordered list of tokens bottom up, although other examples are also contemplated. Nodes 302, 304, 306 include tokens that match from the ordered list of tokens from the structured information, e.g., the file paths, in the order of the lists. For nodes 308, 316, however, the tokens do not match in the order, even though these tokens may match other tokens later in the order.

Consequently, the naming module 118 assigns these tokens (e.g., Desktop and xcconfig) to different nodes, thereby forming branches in the tree structure 300. Accordingly, a first branch that includes tokens 308, 310, 312, 314 corresponds to a first collection of structured information (e.g., a first file path) whereas a second branch that includes tokens 316, 318, 320, 322, 324, 326 corresponds to a second collection of structured information, e.g., the second file path. The tree structure 300 may then be leveraged to extract keywords for tagging as further described in the following.

Returning now again to FIG. 2, the keyword extraction module 208 may traverse the tree structure (e.g., in a bottom up fashion) to collect keywords for tagging, including use in differentiation of the first and second collections of structured information. An example technique for performing this extraction is described as follows:

```
differentiate( )
}
    If (no child)
    }
        return m_token, m_expr_id;
    }
    declare results;
    for each child
    {
        differentiate child storing result in results
    }
    if (more than 1 result)
    {
        check for duplicates in results; if there are some then add m_token as
        another keyword;
        return results;
    } else if (1 result)
    {
        Return m_token, expr_id from result;
    }
}
```

The tagging module 210 may then process this result. For example, the tagging module 210 may map each unique number returned in a first step of the differentiation with a number in results from a second step of the differentiation to tag keywords. The naming module 118 may then expose this differentiated data 204, which may be utilized by applications 112, the operating system 110, and so on to derive a name to be used to the files 114.

As shown in FIG. 1, for instance, this may be utilized to generate different names 124 for the files 114 using the tree structure 300 as follows:

Chrysanthemum.jpg-xcconfig; and
Chrysanthemum.jpg-Desktop.

Thus, in this example tokens are selected from matching nodes and non-matching nodes which shows both correspondence between the files as well as differentiates the files from each other.

In this way, the naming module 118 may support techniques that may efficiently grow in both time and space as these techniques may grow linearly with a number of tokens. As previously described, the naming module 118 may accept as inputs structured information other than file paths 116. The structured information is first analyzed to create an ordered list of tokens, which is then inserted into a tree structure that is traversed to create differentiating keywords. In the context of a contacts example, contact data and associated metadata may be accepted by the naming module 118 and processed to also expose differentiated data 204.

Example Procedures

The following discussion describes structured information differentiation and naming techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

FIG. 4 depicts a procedure 400 in an example implementation in which tokenizing and tagging are utilized to differentiate structured information. First and second collections of structured information are tokenized by a computing device to generate a first ordered list of tokens that correspond to the first collection of structured information and a second ordered list of tokens that correspond to the second collection of structured information (block 402). In a file path example, file path separators may be utilized to identify tokens. Other examples are also contemplated, such as to follow a specified ordering to metadata associated with contacts and so forth.

The first and second ordered list of tokens are inserted into a tree structure by the computing device in order (block 404). This may include assigning tokens from the first and second ordered lists that match in the order to a same node (block 406). As shown in the tree structure 300 of FIG. 3, for instance, tokens of "Chrysanthemum.jpg" and "Sample Pictures" are assigning to single nodes, respectively, as these tokens are at a same placement in the order (e.g., bottom up through the file path) and match. Non-matching tokens, however, are assigned to different nodes (block 408). Continuing with the previous example, at a next step in the order the tokens "Desktop" and "xcconfig" do not match and are therefore assigned to different nodes, thereby creating branches in the tree structure 300.

The first and second collections of the structured information are tag by traversing the tree structure such that both the first and second collections of the structured information are tagged using at least one of the tokens at matches and the first collection of structured information is tagged using one or more other tokens that are different that one or more other tokens that are used to tag the second collection of structured information (block 410). The tags of the first and second collections of structured information are then output (block 412), such as to an application 112, operating system 110, and so on to use in differentiation of the structured data. Continuing with the previous example, tokens in the tree structure 300 may be tagged such that tokens are selected to name the first collection of structured data "Chrysanthemum.jpg-xcconfig" and the second collection of structured data "Chrysanthemum.jpg-Desktop" as illustrated in FIG. 1.

Figure 5:
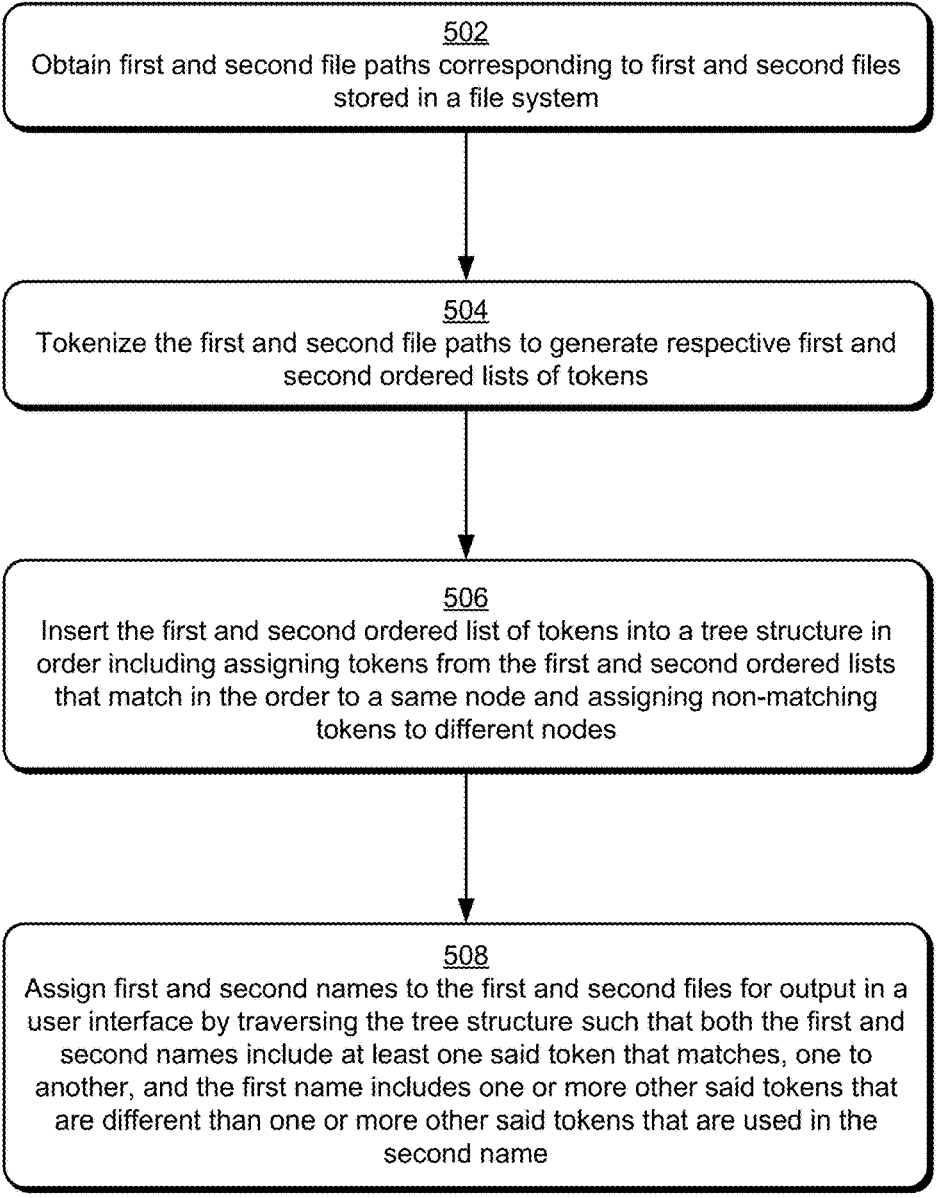
FIG. 5 is a flow diagram depicting a procedure in accordance with one embodiment in which names are assigned to differentiate files from each other by leveraging a tree structure formed form tokenized file paths.

FIG. 5 depicts a procedure 500 in an example implementation in which names are assigned to differentiate files from each other by leveraging a tree structure formed form tokenized file paths. First and second files paths are obtained that correspond to first and second files stored in a file system (block 502). As previously described, an operating system 110 may maintain a file hierarchy to manage storage of files 114. Consequently, file paths 116 may describe where the files 114 are located in this hierarchy.

The first and second file paths are tokenized to generate respective first and second ordered lists of tokens (block 504). The tokens, for instance, may be identified in the file paths 116 using file path separators "/". Further, the first and second lists may follow the same order, e.g., "bottom up" through the file hierarchy.

The first and second ordered list of tokens are inserted into a tree structure in order including assign tokens from the first and second ordered lists that match in the order to a same node and assigning non-matching tokens to different nodes (block 506). As shown in the tree structure 300 of FIG. 3, tokens "Chrysanthemum.jpg" and "SamplePictures" are assigned to nodes 304, 306, respectively. However, tokens "Desktop" and "xcconfig" are assigned to different nodes 308, 316, respectively, thereby forming branches in the tree structure 300.

First and second names are assigned to the first and second file for output in a user interface by traversing the tree structure such that both the first and second names include at least one token that matches, one to another, and the first name includes one or more other tokens that are different than one or more other tokens that are used in the second name (block 508). The tree structure 300, for instance, may be utilized to identify likenesses, differences, frequency in occurrence, and so on in the tokens that are usable to name the files. Thus, the tree structure 300 may be utilized to address a variety of considerations in naming files 114 or differentiating structured data, such as to include a minimal number of tokens in the name that are usable to differentiate one file 114 from another. Other examples are also contemplated as previously described.

Example System and Device

Figure 6:
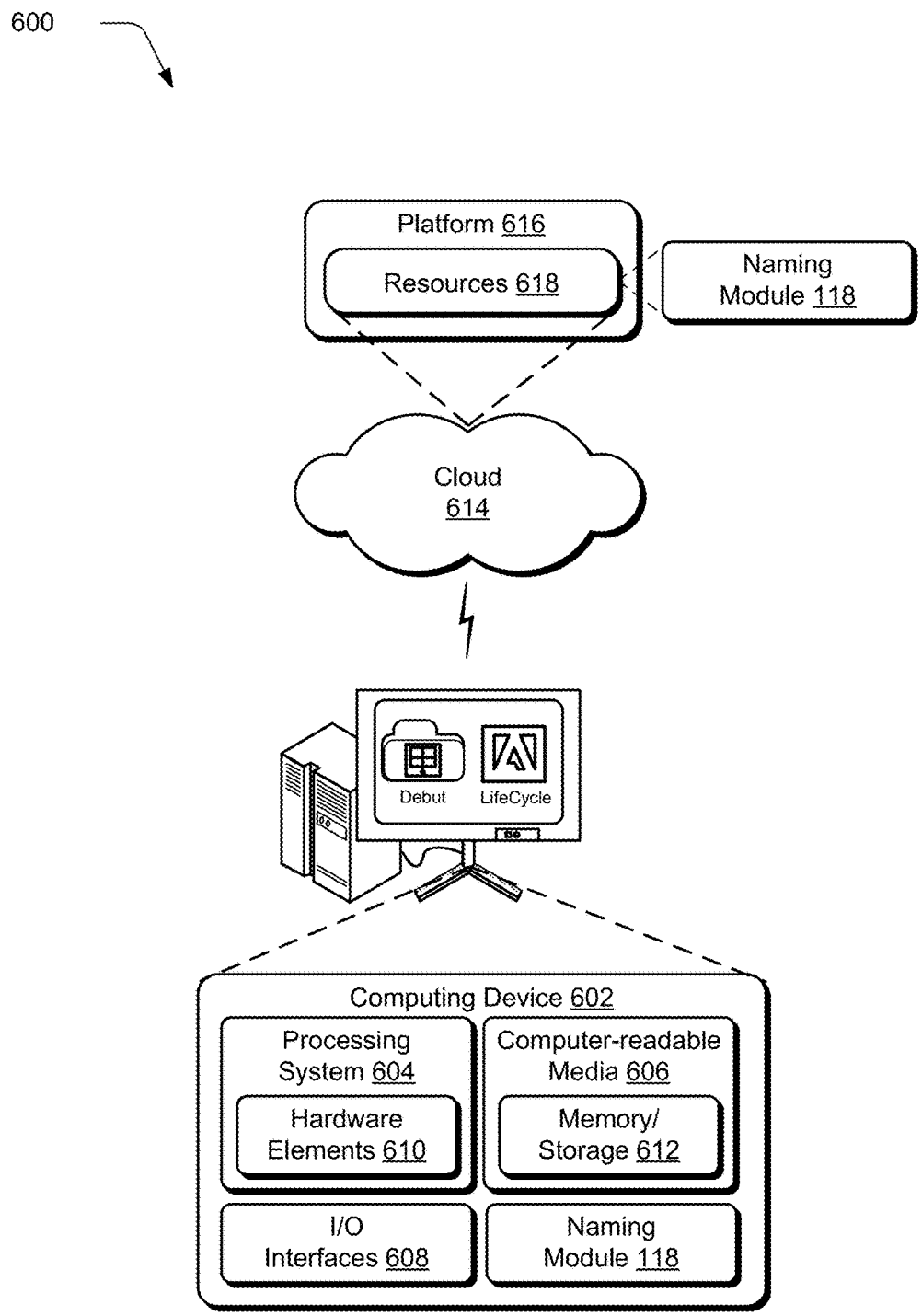
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the naming module 118. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    generating, by a computing device, a first ordered list of tokens that correspond to a first collection of structured information and a second ordered list of tokens that correspond to a second collection of structured information, wherein the first ordered list of tokens has at least one token, but not all tokens, that is identical to a token in the second ordered list of tokens;
    inserting, by the computing device, the first ordered list and second ordered list of tokens into a tree structure by assigning tokens from the first ordered list and the second ordered list that match each other and are in a same placement in a bottom up order of the first and second collections of structured information, to a same node to form a first branch in the tree structure and assigning tokens from the first ordered list and the second ordered list that are in a same placement in the bottom up order and that do not match each other to different nodes to form a second branch and a third branch in the tree structure, wherein tokens from the first ordered list that do not match are inserted into the second branch and the tokens from the second ordered list that do not match are inserted into the third branch;
    differentiating, after the inserting the first and second ordered lists of tokens, the first and second collections of structured information by traversing the tree structure in a bottom up order by:
        tagging both the first and second collections of the structured information using at least one of the tokens that matches from the first branch; and
        tagging the first collection of structured information using one or more of the tokens from the second branch that are different than one or more of the tokens from the third branch that are used to tag the second collection of structured information;
        tagging the second collection of structured information using one or more of the tokens from the third branch that are different than one or more other tokens from the second branch that are used to tag the first collection of structured information; and
    outputting first and second names in a user interface as representations of the first and second collections of structured information, wherein the first and second names are different respectively, based on the tags of the first and second collections of structured information using the tokens from the second and third branches.

2. A method as described in claim 1, wherein the first list of tokens follows a structure of the first collection of structured information and the second list of tokens follows a structure of the second collection of structured information.

3. A method as described in claim 1, wherein the first and second collections of structured information are file paths and the output first and second names are used to represent files at locations of the file paths in a user interface output by the computing device.

4. A method as described in claim 3, wherein the generating is performed using path separator as indicative of tokens.

5. A method as described in claim 1, wherein the first and second collections of structured information correspond to contacts and the output first and second names are used to differentiate the contacts in a user interface output by the computing device.

6. A method as described in claim 1, wherein the differentiating is performed such that a minimum number of tokens are used to differentiate the first collection from the second collection.

7. A system comprising:
    one or more modules for differentiating files with similar names, the one or more modules implemented at least partially in hardware of a computing device, the one or more modules configured to perform operations comprising:
    obtaining first and second file paths corresponding to first and second files stored in a file system;
    generating a first ordered list of tokens that correspond to the first file path and a second ordered list of tokens that correspond to the second file path, wherein the first ordered list of tokens has at least one token, but not all tokens, that is identical to a token in the second ordered list of tokens;
    inserting the first ordered list and second ordered list of tokens into a tree structure by assigning tokens from the first ordered list and the second ordered list that match each other and are in a same placement in a bottom up order of the first and second file paths, to a same node to form a first branch in the tree structure, and assigning tokens from the first ordered list and the second ordered list that are in a same placement in the bottom up order and that do not match each other to different nodes to form a second branch and a third branch in the tree structure, wherein tokens from the first ordered list that do not match are inserted into the second branch and the tokens from the second ordered list that do not match are inserted into the third branch;
    assigning, after the inserting the first and second ordered lists of tokens, first and second names to the first and second files for output in a user interface by traversing the tree structure in a bottom up order, wherein both the first and second names include at least one of the tokens that matches from the first branch, and the first name includes one or more of the tokens from the second branch that are different than one or more of the tokens from the third branch that are used in the second name; and outputting the first and second names in the user interface as representations of the first and second files, wherein the first and second names are different respectively.

8. A system as described in claim 7, wherein the generating is performed using path separators as indicative of tokens.

9. A system as described in claim 7, wherein the assigning is performed such that a minimum number of tokens are used to differentiate the first file from the second file.

10. A system comprising:
one or more modules for differentiating collections of structured information with similar names, the one or more modules implemented at least partially in hardware, the one or more modules configured to perform operations comprising:
generating, by a computing device a first ordered list of tokens that correspond to a first collection of structured information and a second ordered list of tokens that correspond to a second collection of structured information, wherein the first ordered list of tokens has at least one token, but not all tokens, that is identical to a token in the second ordered list of tokens;
inserting, by the computing device, the first ordered list and second ordered list of tokens into a tree structure by assigning tokens from the first ordered list and second ordered list that match each other and are in a same placement in a bottom up order of the first and second collections of structured information, to a same node, to form a first branch in the tree structure, and creating a second branch and a third branch in the tree structure when respective tokens from the first and second ordered lists are in a same placement in the bottom up order and do not match;

tagging, after the inserting the first and second ordered lists of tokens, the first and second collections of the structured information by traversing the tree structure in a bottom up order by tagging both the first and second collections of the structured information using at least one of the tokens that matches from the first branch and tagging the first collection of structured information using the tokens from the created second branch that are different from the tokens from the third branch that are used to tag the second collection of structured information, wherein the first and second collections are differentiated using tokens from the created second and third branches; and outputting first and second names in a user interface as representations of the first and second collections of structured information, wherein the first and second names are different respectively, based on the tags of the first and second collections of structured information using the tokens from the created second and third branches.

11. A system as described in claim 10, wherein creating the second branch corresponds to the first collection of structured information and creating the third branch corresponds to the second collection of structured information.

12. A system as described in claim 10, wherein the first and second collections of structured information are file paths and the output first and second names are used to represent files at locations of the file paths in a user interface output by the computing device.

13. A system as described in claim 10, wherein the first and second collections of structured information correspond to contacts and the output first and second names are used to differentiate the contacts
in a user interface output by the computing device.

* * * * *